US012619613B2

(12) United States Patent
Bais et al.

(10) Patent No.: US 12,619,613 B2
(45) Date of Patent: May 5, 2026

(54) SYSTEMS AND METHODS FOR GENERATING EXPLAINABLE FEATURES FOR MACHINE LEARNING

(71) Applicant: Elevance Health, Inc., Indianapolis, IN (US)

(72) Inventors: Abhijeet Singh Bais, Naperville, IL (US); Rajan Narayanan, Simi Valley, CA (US); Sanjay Yermalkar, Buffalo Grove, IL (US); Steven Ege, Carol Stream, IL (US); Yinxiang Wang, Kildeer, IL (US)

(73) Assignee: Elevance Health, Inc., Indianapolis, IN (US)

( * ) Notice: Subject to any disclaimer, the term of this patent is extended or adjusted under 35 U.S.C. 154(b) by 0 days.

(21) Appl. No.: 19/066,993

(22) Filed: Feb. 28, 2025

(65) Prior Publication Data

US 2025/0272297 A1     Aug. 28, 2025

Related U.S. Application Data

(60) Provisional application No. 63/558,933, filed on Feb. 28, 2024.

(51) Int. Cl.
*G06F 16/00*        (2019.01)
*G06F 16/22*        (2019.01)
*G06F 16/2455*      (2019.01)

(52) U.S. Cl.
CPC ...... *G06F 16/2456* (2019.01); *G06F 16/2282* (2019.01)

(58) Field of Classification Search
CPC .......................... G06F 16/2456; G06F 16/2282
(Continued)

(56) References Cited

U.S. PATENT DOCUMENTS 10,810,210 B2 * 10/2020 Choudhury ......... G06F 16/2379
                                                         707/707
2022/0114483 A1 * 4/2022 Sabharwal .......... G06F 16/9536
                                                         707/707
(Continued)

OTHER PUBLICATIONS

International Search Report and Written Opinion for related International Application No. PCT/US2025/017810, 13 pages, mailed Jun. 25, 2025.
(Continued)

*Primary Examiner* — Alexandria Y Bromell
(74) *Attorney, Agent, or Firm* — Morgan, Lewis & Bockius LLP

(57)     ABSTRACT

A system and method are provided for feature engineering. The method may include obtaining data from a plurality of data sources. The method may also include generating, based on the data, features for training machine learning models using a single data pipeline that uses a feature generation logic that is separate from an execution logic. The method may also include generating, based on relations and/or joins in the feature generation logic, metadata for explaining the features, and generating, based on the metadata, lineage information representing a mapping of one or more features to intermediate tables and/or input tables. The method may also include displaying the lineage information representing the mapping, including allowing a user to select and/or drill down different features, intermediate tables and/or input tables. The method may also include storing the features and the metadata for the features to a feature store.

4 Claims, 15 Drawing Sheets

(58) Field of Classification Search
USPC .......................................................... 707/741
See application file for complete search history.

(56)                          References Cited

U.S. PATENT DOCUMENTS

| 2023/0259521 A1* | 8/2023 | Haelen ................. | G06F 16/254 |
| | | | 707/602 |
| 2025/0272297 A1* | 8/2025 | Bais .................... | G06F 16/2456 |
| | | | 707/707 |

OTHER PUBLICATIONS

Liu Rui et al., "Optimizing Data Pipelines for Machine Learning in Feature Stores", Proceeding of the VLDB Endowment, vol. 16, No. 13, Sep. 1, 2023, p. 4230.

* cited by examiner

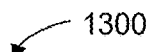
1300

1302 Obtain data from a plurality of data sources. In some embodiments, the plurality of data sources corresponds to a plurality of cloud data platforms.

1304 Generate, based on the data, features for training one or more machine learning models using a single data pipeline that uses a feature generation logic that is separate from an execution logic used to generate the features 1306 Generate, based on the relations and/or joins in the feature generation logic, metadata for explaining the features 1308 Generate, based on the metadata, lineage information representing a mapping of one or more features to intermediate tables and/or input tables 1310 Display the lineage information representing the mapping of one or more features to intermediate tables and/or input tables, including allowing a user to select and/or drill down different features, intermediate tables and/or input tables 1312 Store the features and the metadata to a feature store used for training the one or more machine learning models

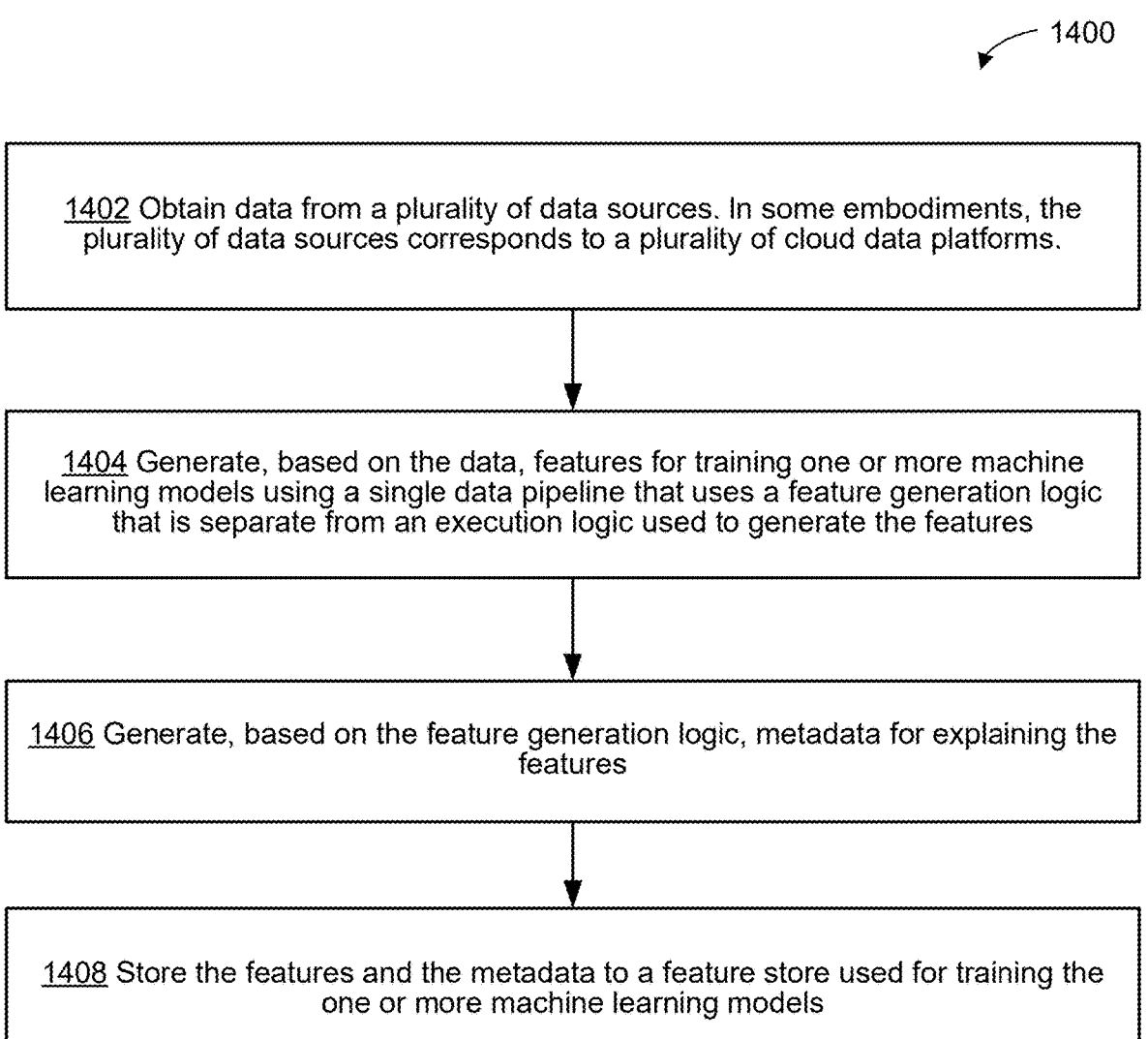

1402 Obtain data from a plurality of data sources. In some embodiments, the plurality of data sources corresponds to a plurality of cloud data platforms.

1404 Generate, based on the data, features for training one or more machine learning models using a single data pipeline that uses a feature generation logic that is separate from an execution logic used to generate the features 1406 Generate, based on the feature generation logic, metadata for explaining the features 1408 Store the features and the metadata to a feature store used for training the one or more machine learning models

Figure 14

SYSTEMS AND METHODS FOR GENERATING EXPLAINABLE FEATURES FOR MACHINE LEARNING

CROSS-REFERENCE TO RELATED APPLICATIONS

This application claims the benefit of U.S. Provisional Application No. 63/558,933, filed Feb. 28, 2024, the entirety of which is incorporated herein by reference.

FIELD

The invention relates to systems and methods for machine learning, and is more particularly, but not by way of limitation, directed to technology for feature engineering for machine learning.

BACKGROUND

Feature engineering is the process of using domain knowledge to create features (e.g., characteristics or properties) for machine learning algorithms. Feature engineering can be used to improve performance of machine learning algorithms. Feature engineering may include creation of features, such as interaction features, aggregate features and indicators, tailored to augment the predictive power of the learning algorithm.

A feature store may be used to manage and serve machine-learning features. The feature store allows reusability and consistency of features across machine learning models. The feature store serves as a repository that enables storage, description, discovery, and access of features. The feature store provides a uniform interface that allows data modelers and data scientists to use the same features across different models. The feature store helps ensure efficiency, reliability and integrity of machine learning models, and enables collaboration between engineering teams. A data pipeline may be used to create a feature store.

The proliferation of cloud services and execution environments pose many challenges for feature engineering. Combining data from different cloud platforms and/or obtaining a unified view of the data can be difficult due to lack of common schemas. Features may need to be normalized before model building. Variation in metrics, data collection APIs and monitoring capabilities across cloud providers may impact feature availability. Features and target variables can change over time.

SUMMARY

Accordingly, there is a need for systems and methods for feature engineering that address at least some of the problems described above. Some embodiments provide a feature engineering data pipeline. The data pipeline may provide consistency. The pipeline may ensure uniformity in the process of data collection, transformation, ingestion, and extraction. This may help ensure that the features generated are consistent across all models, leading to better accuracy in the prediction. The data pipeline may provide scalability and flexibility. With increasing data volume, the pipeline may handle and process growing datasets without compromising performance. The data pipeline may provide integrity. The pipeline may maintain data accuracy and completeness during transformation processes, which are crucial in the quality of the features generated.

For some machine learning applications, features may need to be extracted in real-time. Therefore, the pipeline may handle in-time data process. For example, fraud detection may need to predict fraud before claim approval, so features may need to be available for prediction. The data pipeline may include automated data cleansing and formatting processes, which reduce manual intervention. The data pipeline may also provide observability and lineage. To ensure proper functioning, the pipeline may include mechanisms for tracking data flow, detecting anomalies or issues, and providing alerts to stakeholders. The pipeline may include provisions for tracking changes in feature definitions, transformations applied and raw data, ensuring traceability of the feature generation process.

The feature engineering techniques described herein may include the separation of feature generation logic from execution environment used to generate the features. The execution environment may be cloud-agnostic. Separation of the feature generation from the execution environment allows new features to be added easily. Moreover, the process may include generation of metadata based on the feature generation logic. The metadata may be used to create lineage for features, which may be used to outline the origin and/or processing of features. Furthermore, profiling of the feature generation logic may be used to determine whether execute extraction and/or creation of features based on the appropriateness of the source data. Also, the feature engineering techniques described herein enable a flexible execution pipeline that may accommodate various feature generation frequencies (e.g., 2,000 daily features, 23,000 weekly features) generated using a same feature pipeline. Separate feature generation logic also simplifies source additions. For example, the functional logic may be contained in a JSON-based configuration file, so it is easy to add new data sources.

One or more embodiments of the invention are directed to an improved system and method for feature engineering. The method may be performed at a system or a server having one or more processors, memory, and one or more programs stored in the memory and configured for execution by the one or more processors, the one or more programs including instructions for performing the steps described herein. The method may be implemented in a cloud infrastructure, for example as a cloud service.

The method may include obtaining data from a plurality of data sources. The method may also include generating, based on the data, features for training one or more machine learning models using a single data pipeline that uses a feature generation logic that is separate from an execution logic used to generate the features. The feature generation logic may be based on a type of data source corresponding to the data. The execution logic may be agnostic to the type of data source. The feature generation logic may include relations and/or joins between input tables and/or intermediate tables of the plurality of data sources. Features may be generated by executing the single data pipeline based on the execution logic. The method may also include generating, based on the relations and/or joins, metadata for explaining the features for training the one or more machine learning models. The method may also include generating, based on the metadata, lineage information representing a mapping of one or more features to intermediate tables and/or input tables. The method may also include displaying the lineage information representing the mapping of one or more features to intermediate tables and/or input tables, including allowing a user to select and/or drill down different features, intermediate tables and/or input tables. The method may also include storing the features and the metadata for the features to a feature store used for training the one or more machine learning models.

The method may include obtaining data from a plurality of data sources. In some embodiments, the plurality of data sources corresponds to a plurality of cloud data platforms. In some embodiments, the method further includes prior to obtaining the data, interfacing with the plurality of data sources corresponding to a plurality of cloud data platforms. In some embodiments, the data includes two or more of: streams, files, and tables.

The method may also include generating, based on the data, features for training one or more machine learning models using a single data pipeline that uses a feature generation logic that is separate from an execution logic used to generate the features. The feature generation logic may be based on a type of data source corresponding to the data. The execution logic may be agnostic to the type of data source. In some embodiments, the feature generation logic includes relations and/or joins between input tables and/or intermediate tables of the plurality of data sources used to derive the features. The metadata may be generated based on the relations and/or joins. In some embodiments, the features are generated by executing the single data pipeline based on the execution logic. In some embodiments, the method further includes generating the features comprises configuring and executing queries in the data pipeline based on the feature generation logic. In some embodiments, the method further includes determining whether to execute or postpone feature generation based on whether a source of the data is updated. In some embodiments, the feature generation logic is implemented using SQL queries. In some embodiments, the feature generation logic includes toggle switches for turning on or off portions specific to data sources of the plurality of data sources, for debugging purposes. In some embodiments, the feature generation logic provides an interface that allows model developers or data scientists to add features to the feature store. For example, after a configuration is added to the feature generation logic, features may be automatically generated (e.g., without data pipeline deployment for generating a new feature set).

The method may also include generating, based on feature generation logic, metadata for explaining the features.

The method may also include storing the features and the metadata to a feature store used for training the one or more machine learning models.

In some embodiments, the method further includes generating, based on the metadata, lineage information representing a mapping of one or more features to intermediate tables and/or input tables.

In some embodiments, the method further includes displaying the lineage information representing the mapping of one or more features to intermediate tables and/or input tables, including allowing a user to select and/or drill down different features, intermediate tables and/or input tables.

In some embodiments, the method further includes identifying updated data sources for triggering feature generation based on profiling the feature generation logic.

In some embodiments, the method further includes, while generating the features, generating only a subset of the features based on frequency of training of the one or more machine learning models.

In some embodiments, the method further includes combining the metadata with the feature generation logic and storing the combination in a text-based format for representing structured data.

In some embodiments, a computer system has one or more processors, memory, and a display. The one or more programs include instructions for performing any of the methods described herein.

In some embodiments, a non-transitory computer readable storage medium stores one or more programs configured for execution by a computer system having one or more processors, memory, and a display. The one or more programs include instructions for performing any of the methods described herein.

BRIEF DESCRIPTION OF THE DRAWINGS

FIG. 13 is a flowchart of an example method for engineering explainable features for machine learning, in accordance with some embodiments.

FIG. 14 is a flowchart of an example method for engineering explainable features for machine learning, in accordance with some embodiments.

DETAILED DESCRIPTION OF THE PREFERRED EMBODIMENTS

The following descriptions of embodiments of the invention are exemplary, rather than limiting, and many variations and modifications are within the scope and spirit of the invention. Although numerous specific details are set forth in order to provide a thorough understanding of the present invention, it will be apparent to one of ordinary skill in the art, that embodiments of the invention may be practiced without these specific details. In other instances, well-known features have not been described in detail in order to avoid unnecessarily obscuring the present invention.

One or more embodiments of the invention are directed to an improved method and system for feature engineering.

Figure 1:
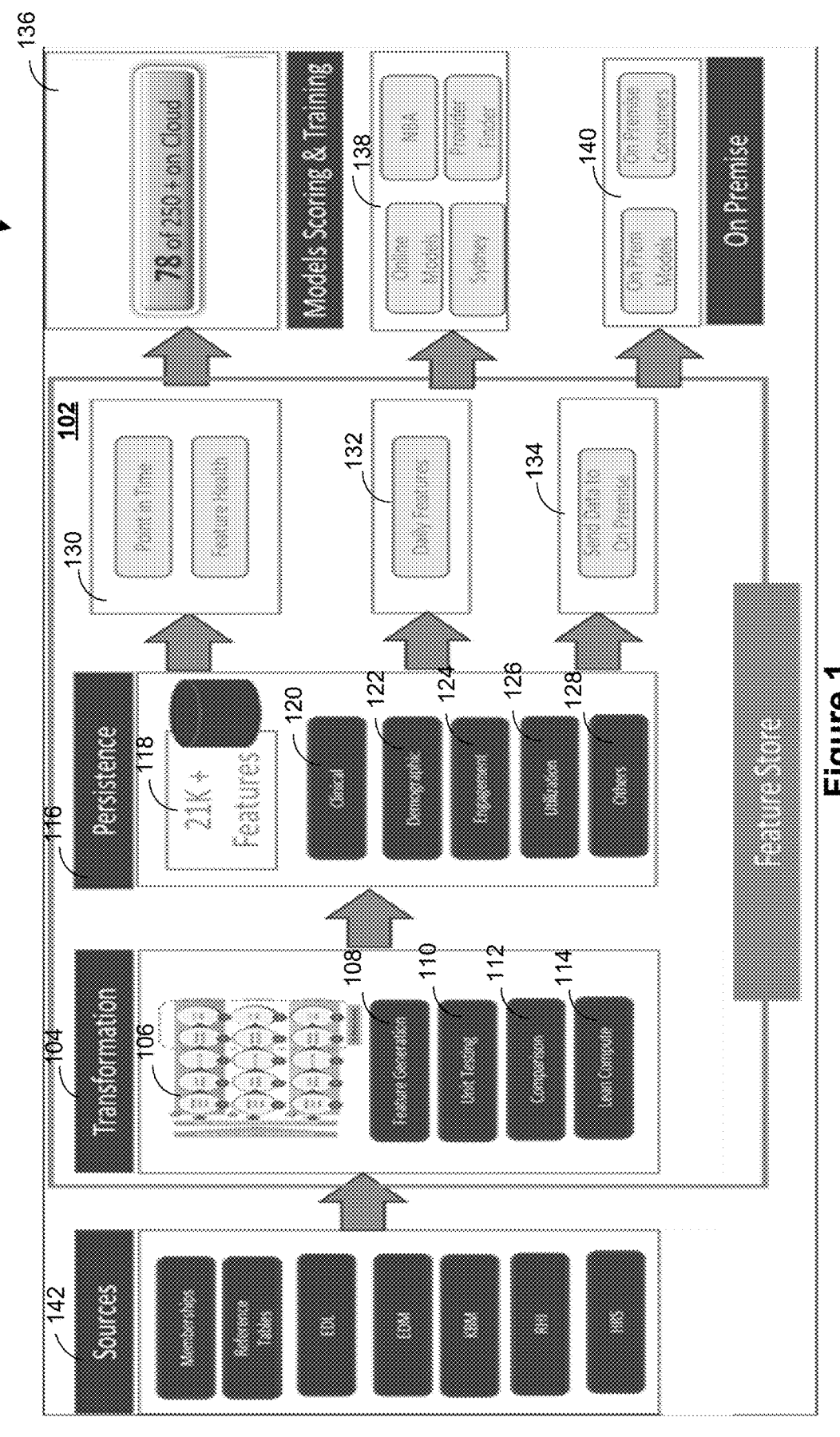
FIG. 1 is a schematic diagram of an example system for feature engineering, according to some embodiments.

FIG. 1 is a schematic diagram of an example system 100 for feature engineering, according to some embodiments.

The system 100 may include sources 142, feature store 102 for producing, storing, and/or supplying features, models 136 for scoring and training, consumers 138, such as online models, and/or on-premises consumers 140, such as on-premises models. The components of the system 100 may be implemented in a cloud infrastructure, for example as a cloud service. The sources 142 may include data for memberships, reference tables, and/or data sources for electronic data interchange (EDI) for eligibility benefit inquiry and/or response, electronic document management (EDM) for systems that digitize health records and related documentation, utilization metrics, reinsurance health insurance (RHI) that refer to reinsurance activities, and/or health risk assessment (HRS) that evaluate a patient's health risks and needs. The feature store 102 may include transformation 104 for transforming data from the data sources 142 to obtain features that are stored in persistence 116. The persistence 116 may be used to generate (or provide) features for point in time and/or feature health information 130, daily features 132, and/or send data 134 to on-premises consumers.

The feature store 102 may be used to generate features from raw datasets. The feature store may be used to provide features to one or more machine learning models (typically, a plurality of models) for training and/or inference. An offline feature store may be used instead of or in addition to an online feature store, which may be configured for real-time updates. A model analytic dataset may be used to implement a feature store, and may include information (e.g., member information for insurance purposes) stored as features. Features may be derived from raw data of various sources. The feature store 102 may store and/or refresh features on a periodic basis (e.g., hourly, daily, weekly). The feature store 102 may serve the features for model training and/or inference. Hundreds of models may be supported by a single feature store. Separate model analytic datasets may be used for claims, members and/or providers, for instance. A model analytic dataset may include a data layer comprising multiple tables (e.g., tables on Teradata). A single table may be generated monthly/weekly on Hadoop. Multiple tables may be generated daily on Hadoop. A model analytic dataset may include a feature catalog that may in turn include a data dictionary with metadata related to features. The metadata may include feature tables and descriptions, source tables, feature list and descriptions, and/or feature types.

The transformation 104 in the feature store 102 may include one or more data pipelines 106 (details of which are described below in reference to FIG. 2, according to some embodiments). The transformation 104 may also include feature generation 108, unit testing 110, comparison 112, and/or lean compute 114, details of which are described below, according to some embodiments.

The transformation 104 in the feature store 102 may include persistence 116, which may be used to persist features from the transformation 104. Tens of thousands of features 118 may be stored in a database. The features may be classified and/or categorized as clinical 120, demographic 122, engagement 124, utilization 126 and/or other or miscellaneous categories 128.

Figure 2:
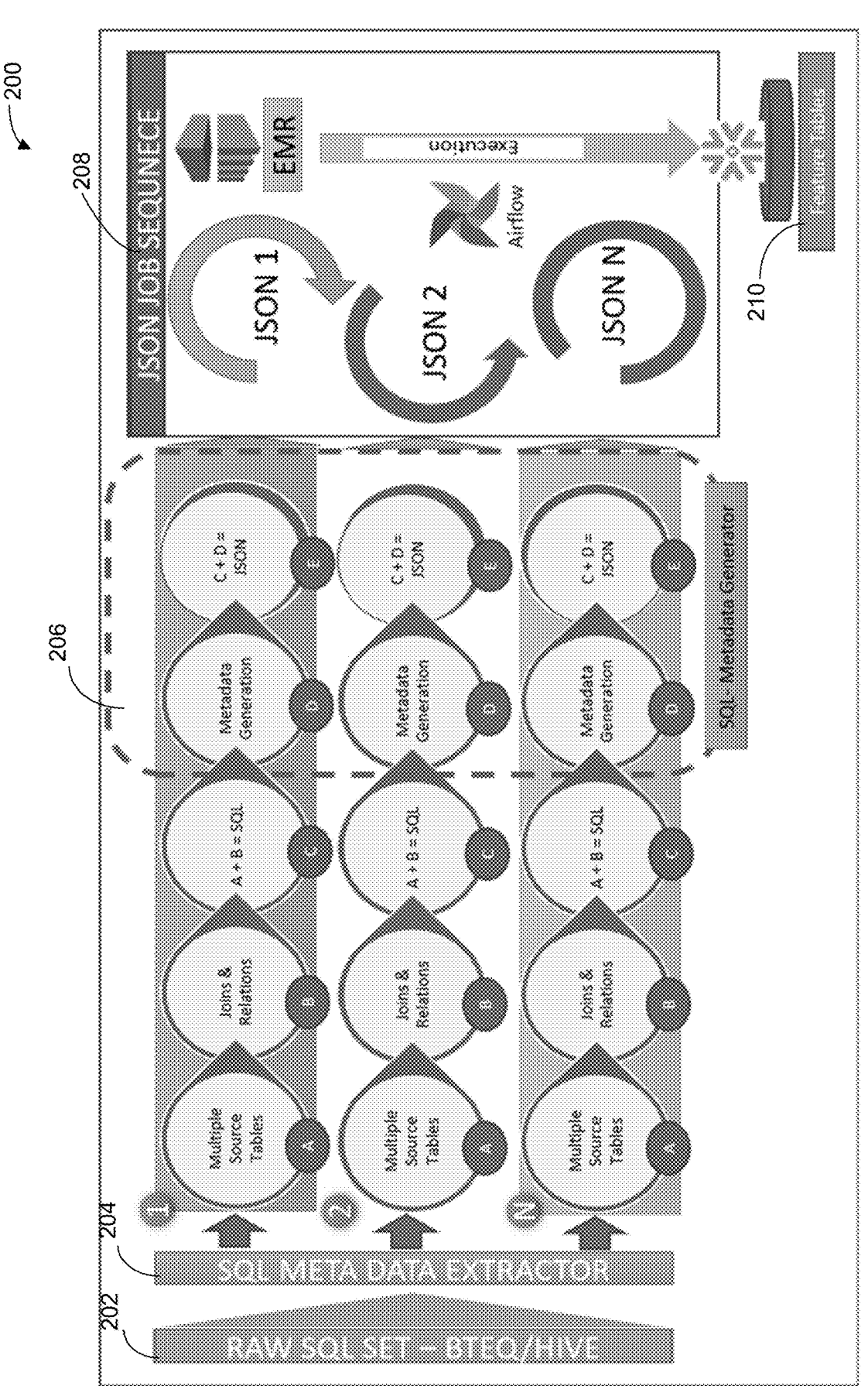
FIG. 2 is a schematic diagram of an example transformation system for feature engineering, according to some embodiments.

FIG. 2 is a schematic diagram of an example transformation system 200 (e.g., the transformation 104) for feature engineering, according to some embodiments. The components of the system 200 may be implemented in a cloud infrastructure, for example as a cloud service. Raw data 202 (e.g., raw SQL data) may be obtained from the data sources. Raw data may be obtained from Brightics Terminal Query (BTEQ), Hive and/or other similar SQL query interfaces and engines for querying big data stored on Hadoop and related distributed systems. Metadata 204 may be extracted from the SQL data. One or more data pipelines (e.g., pipelines 1, 2, . . . , N in FIG. 2) may be used to process the raw data and/or metadata extracted from the data sources. Each data pipeline may (A) obtain multiple source tables. Each data pipeline may also (B) obtain joins and/or relations (joins and relations refer to how tables in a SQL database can be connected and associated with one another via key columns in their structure). In some embodiments, each data pipeline may (C) combine the source tables and the joins and relations related information and/or store the combined data in SQL tables. Some embodiments of the data pipelines include a metadata generator 206. The metadata generator may include (D) metadata generation and/or (E) step for combining information from steps (C) and (D) and/or storing the information in a data interchange format. Any format (e.g., JSON, text files, csv, Java script YAML, Message pack) suitable for reading, writing, parsing and/or generation, may be used for this purpose. Each data pipeline may generate a respective file (e.g., JSON 1 from pipeline 1, JSON 2 from pipeline 2, and so on). A job sequencer 208 may be included in the system 200. The job sequencer may include an infrastructure (e.g., Elastic MapReduce) to run big data applications, a workflow management platform (e.g., Airflow) for orchestration and scheduling of data pipelines, and/or data warehouse capabilities (e.g., Snowflake), for analysis of types of data. Some embodiments allow storage and analysis of data across on-premises systems and public clouds. Some embodiments include data warehouse capabilities without managing infrastructure. Feature tables 210 may store features from the job sequencer 208.

Figure 3:
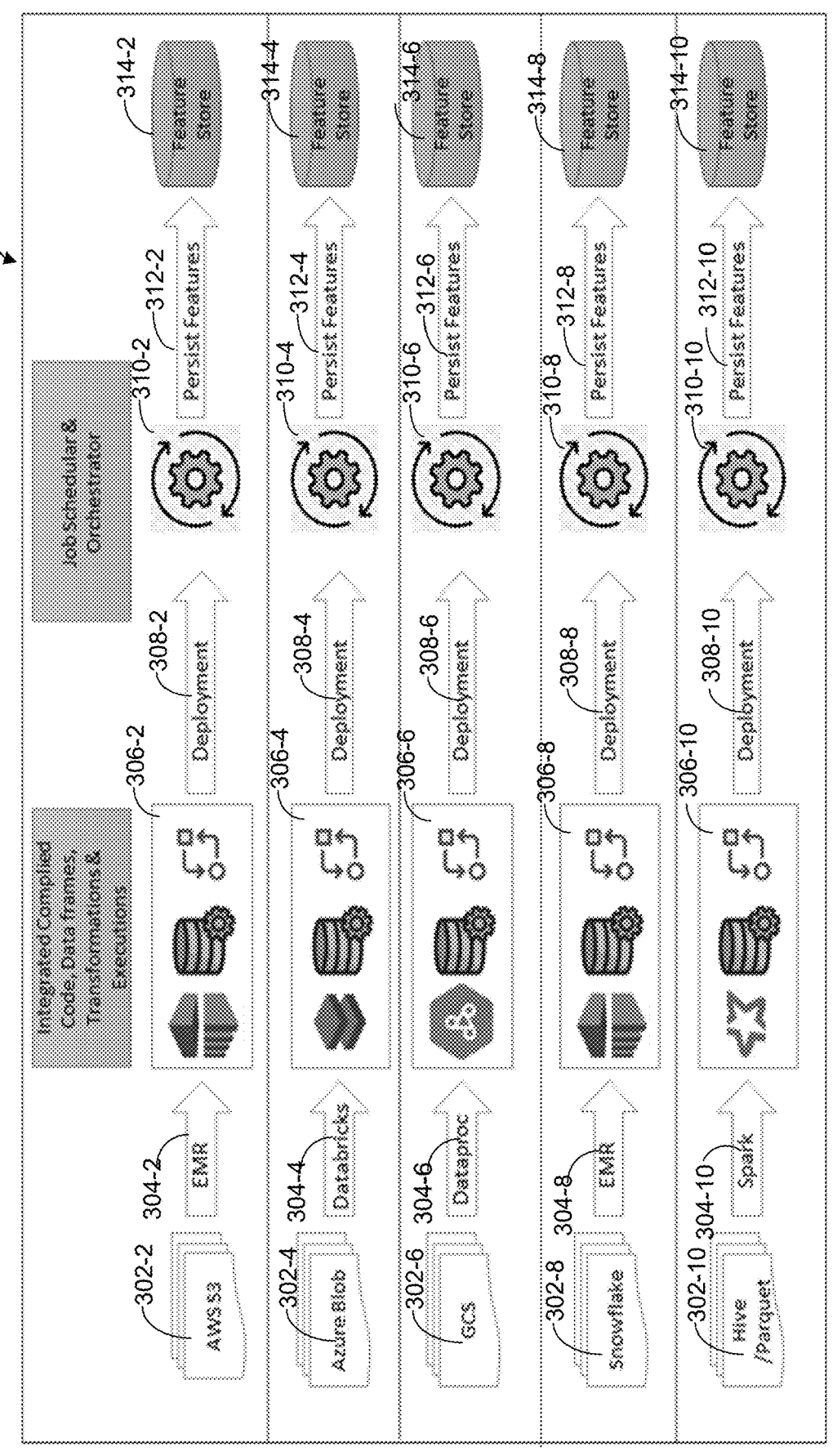
FIG. 3 is a schematic diagram of an example system that includes independent feature data pipelines, according to some embodiments.

FIG. 3 is a schematic diagram of an example system 300 that includes independent feature data pipelines, according to some embodiments. The data pipelines may be based on specific environments. For example, a first data pipeline may correspond to AWS S3 302-2, include Elastic MapReduce (EMR) 304-2, an Amazon Web Services (AWS) platform, an integrated compiled code, data frames, transformations and executions 306-2, deployment 308-2, job scheduler and orchestrator 310-2, persist features 312-2 to a feature store 314-2. A second data pipeline may correspond to Azure blob 302-4 (Microsoft's object storage service), include Databricks or a similar managed Apache Spark platform that may integrate with data stored in the Azure blob containers, allowing easy ingestion of unstructured blob data, an integrated compiled code, data frames, transformations and executions 306-4, deployment 308-4, job scheduler and orchestrator 310-4, persist features 312-4 to a feature store 314-4. A third data pipeline may correspond to Google cloud storage (GCS) 302-6, include Dataproc 304-6, an integrated compiled code, data frames, transformations and executions 306-6, deployment 308-6, job scheduler and orchestrator 310-6, persist features 312-6 to a feature store 314-6. A fourth data pipeline may correspond to Snowflake 302-8, include EMR 304-8, an integrated compiled code, data frames, transformations and executions 306-8, deployment 308-8, job scheduler and orchestrator 310-8, persist features 312-8 to a feature store 314-8. A fifth data pipeline may correspond to Hive/Parquet 302-10, include Spark 304-6 (Apache Spark's capabilities to access, read and write data stored in Hive tables and Parquet file format), an integrated compiled code, data frames, transformations and executions 306-10, deployment 308-10, job scheduler and orchestrator 310-10, persist features 312-10 to a feature store 314-10. The system shown in FIG. 3 is tightly coupled, may include environment-specific code and/or transformation, which may cause not be easy to change difficult. Compiled code may not be easy to read and/or it may be difficult to add new features. The system may not provide explainability or lineage information and/or data pipeline predictability. Code may not contain metadata. Furthermore, it is difficult to validate sources before feature generation. Last but not least, the environment-specific pipeline may need to be re-coded for each framework.

Figure 4:
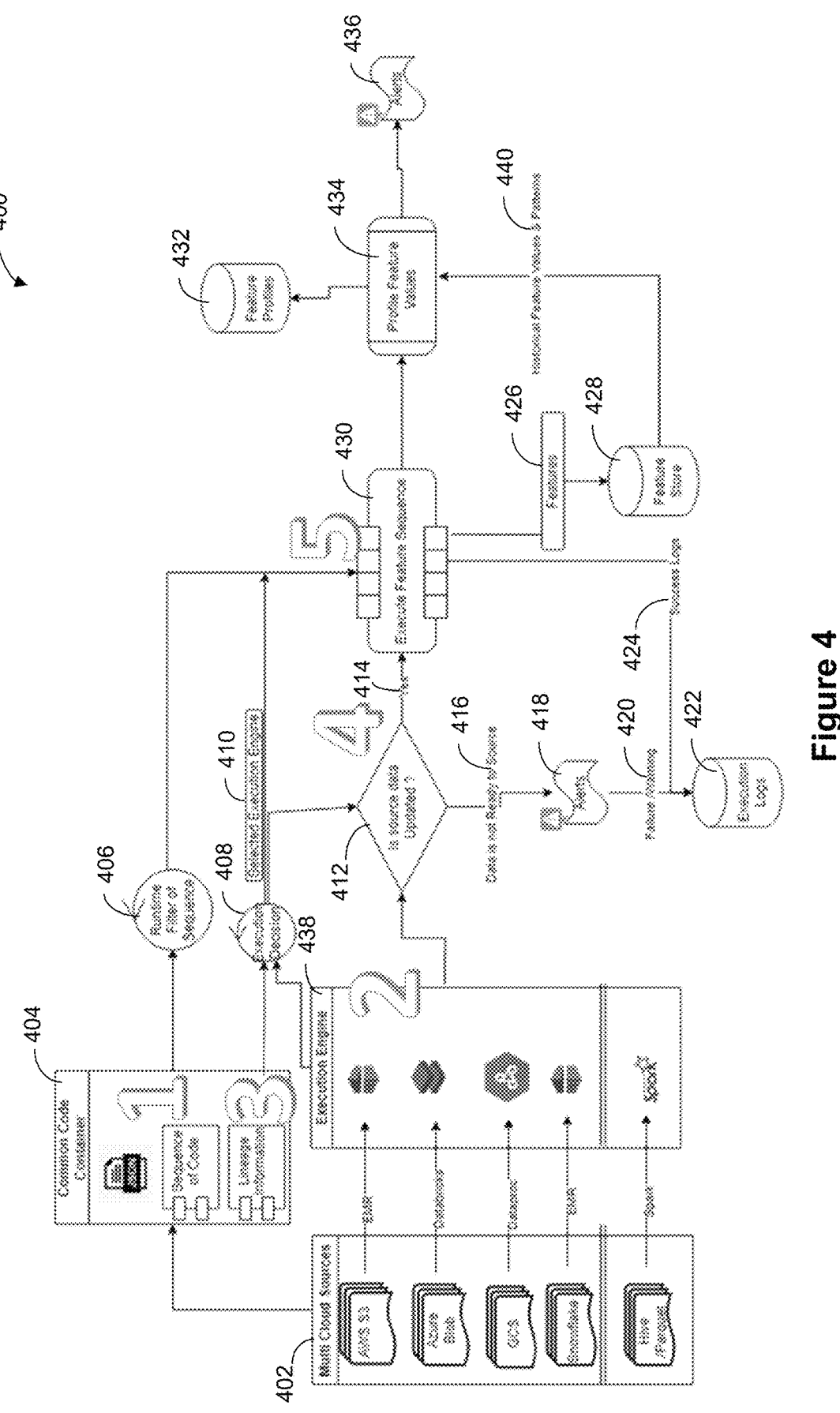
FIG. 4 is a schematic diagram for an example system for feature engineering, according to some embodiments.

FIG. 4 is a schematic diagram for an example system 400 for feature engineering, according to some embodiments. The components of the system 400 may be implemented in a cloud infrastructure, for example as a cloud service. The system 400 may obtain data from a plurality of cloud sources 402 (sometimes referred to as multi-cloud services; e.g., Amazon AWS S3, Microsoft Azure blob, GCS, Snowflake, Hive/Parquet). The system may include an integrated data pipeline that may include an execution engine 438 that obtains data from the multi-cloud services 402 using Elastic MapReduce (EMR) for Amazon Web Services (AWS) S3, Databricks or a similar managed Apache Spark platform that may integrate with data stored in the Azure blob containers, Dataproc 304-6 for Google cloud storage (GCS), EMR for Snowflake, and/or Spark for Spark Hive/Parquet.

The system 400 may include a common code container 404 that may include separate code and execution. Because of this separation, the code can be easy to read and/or modify. The system may include a generic execution engine that may work in any environment. The system may include metadata extraction (e.g., metadata is extracted from the separated code). The system may also generate lineage information and/or provide explainability of feature pipeline. The system may also check source data availability before the feature pipeline and thereby enhance predictability of the pipeline. The system may include selective code generation as per configuration. For example, based on configuration of the cloud source, different code generation may be performed. Metadata and relations structure may vary between embodiments. For example, one query may have two join conditions, and another query may have five join conditions. Number of joining tables may vary based on business logic. Accordingly, a flexible schema may be provided for meta data storage. Some embodiments use a semi-structured system (e.g., JSON) to store the code logic.

A runtime may filter (406) a sequence from the sequences of code in the common code container 404. A candidate execution engine 410 may be selected from the execution engine 438 based on the common code container 404. The system may determine (412) if a source data is updated. If the source data is updated, the system may use the candidate execution engine 410 to execute feature sequence 430. If the source has not been updated (data is not ready to source 416), the system may generate an alert 418 for a failure or warning 420 that may be written to an execution log 422. After the feature sequence is executed (430), a success message 424 may be written to the execution logs 422. Execution of a feature sequence may generate features 426 that may be written to a feature store 428. The system may profile (434) feature values to obtain feature profiles 432. The profiling may also result in alerts 436. Historical feature values and patterns 440 may be obtained from the feature store 428 for profiling feature values.

Figure 5:
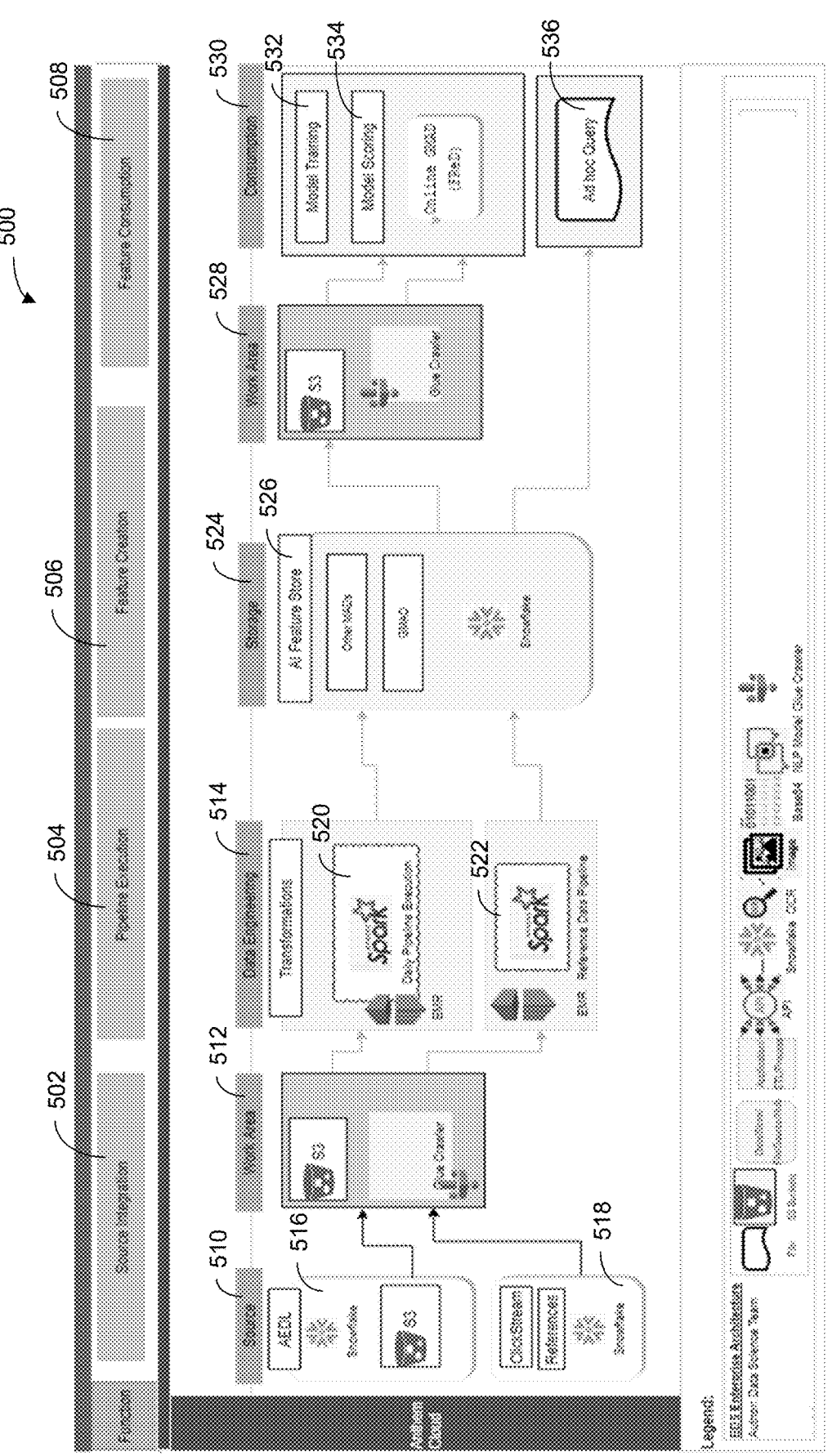
FIG. 5 is a schematic diagram of an example system for feature engineering, according to some embodiments.

FIG. 5 is a schematic diagram of an example system 500 for feature engineering, according to some embodiments. The components of the system 500 may be implemented in a cloud infrastructure, for example as a cloud service. The system may include source integration 502, pipeline execution 504, feature creation 506, and/or feature consumption 508. The source integration 502 may include data from source 510 that may include enterprise data lake 516 and/or analytics data 518 (e.g., Clickstream) sourced into a work area 512. The work area 512 may include a crawler that may be used to automatically identify data, extract schemas and/or create searchable indexed metadata, which may help enable analytics and reporting on data lakes. The pipeline execution 504 may include data engineering 514 which may include transformations for daily pipeline execution 520 and a reference data pipeline 522, both of which may use the data from the work area 512 to engineer features stored in the storage 5124 (included in the feature creation 506). The storage 524 may store the features stores in a feature store 526. The feature store 526 may store the features as analytic datasets. For feature consumption 508, the features in the feature store 526 may be moved to a work area 528 (may be same as or similar to the work area 512) before being retrieved for consumption 530. The consumption 530 may include model training 532 and/or model scoring 534 based on the features. The feature consumption 508 may also include ad hoc query 536 which may be used to query the feature store 526 for specific features (or feature related information).

Figure 6:
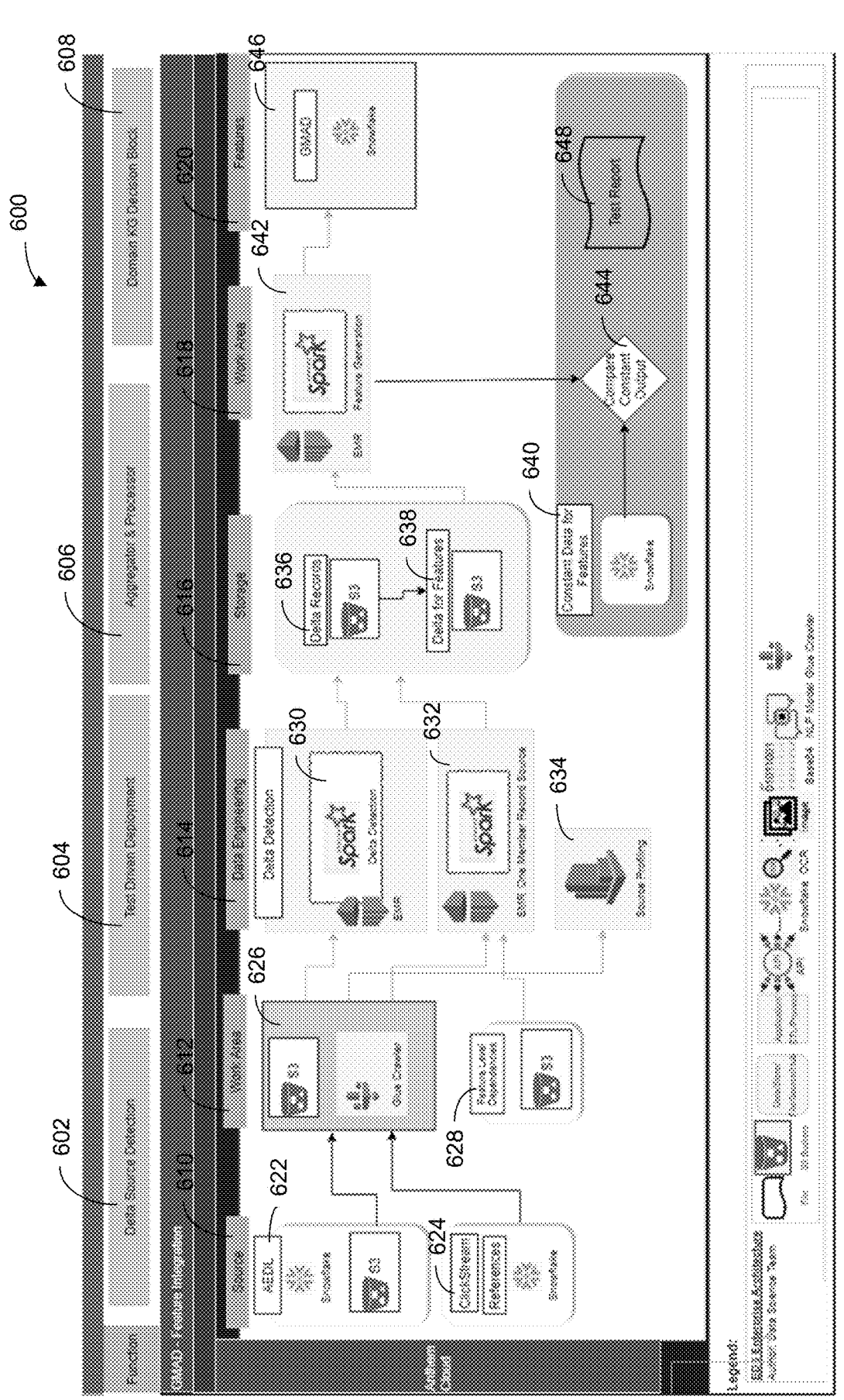
FIG. 6 is a schematic diagram of an example system for feature integration, according to some embodiments.

FIG. 6 is a schematic diagram of an example system 600 for feature integration, according to some embodiments. The components of the system 600 may be implemented in a cloud infrastructure, for example as a cloud service. The system may include data source detection 602, test driven deployment 604, aggregate and processor 606, and/or decision block 608. The data source detection may include data from source 610 that may include enterprise data lake 622 and/or analytics data 624 (e.g., Clickstream) sourced into a work area 612. The work area 612 may include a crawler that may be used to automatically identify data, extract schemas and/or create searchable indexed metadata, which may help enable analytics and reporting on data lakes. The work area 612 may also include feature level dependencies 628. The test driven deployment 604 may include data engineering 614 which may include delta detection 630 (e.g., for detecting changes in the work area and/or data sources, and/or generate delta records and/or delta features), a member record source 632, and/or source profiling 634. Delta records 636 and delta for features obtained from the delta record 636, may be stored in a storage 616 as part of the aggregator and processor 606. The delta records 636 and/or the delta for features 638 may be moved to a work area 618 for feature generation 642. Features generated by the feature generation 642 may be compared (644) to constant data for features 640, and/or a test report 648 may be generated. Features generated by the feature generation 642 may be stored in features 620 as analytic datasets 646.

Figure 7:
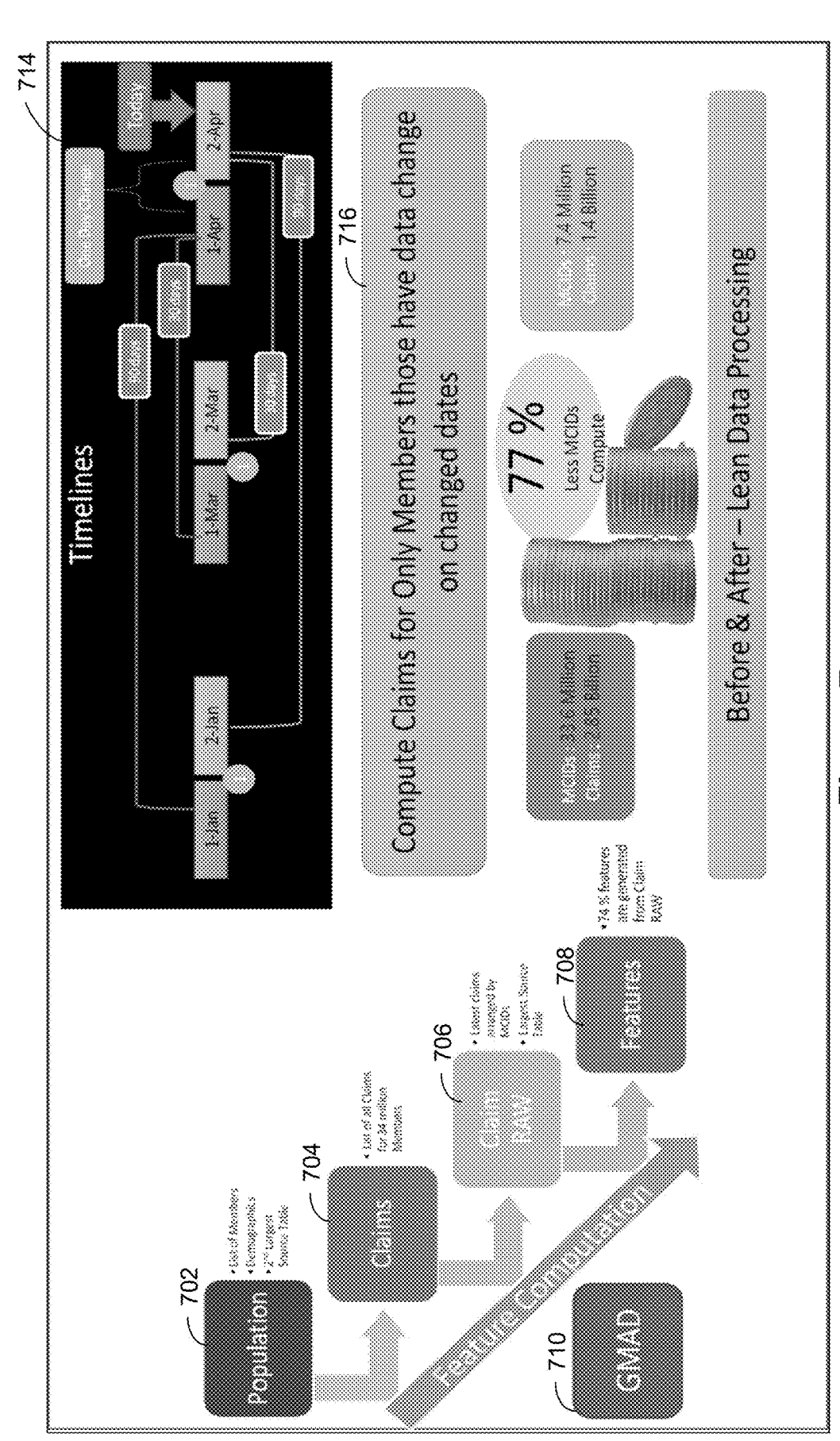
FIG. 7 is a schematic diagram of an example pipeline for feature computation, in accordance with some embodiments.

FIG. 7 is a schematic diagram of an example pipeline for feature computation 700, in accordance with some embodiments. The components of the pipeline 700 may be implemented in a cloud infrastructure, for example as a cloud service. Population data 702 that may include list of members, demographics and/or source table, may be processed to obtain claims 704 (e.g., a list of all claims for millions of healthcare members). The claims 704 may be organized and/or rearranged to obtain raw claims 706 whereby latest claims may be arranged by minimal clinically important differences (MCIDs) in one or more tables. Features 708 may be generated based on the raw claims 706. The features generated 708 may be organized analytic datasets 710. Some embodiments compute features (e.g., claims) for only entities (e.g., members) that have data change on specific dates (an example timeline 714 is shown). Due to this lean data processing, a majority of the MCIDs may not be computed (e.g., 77% less MCIDs may be computed).

Figure 8:
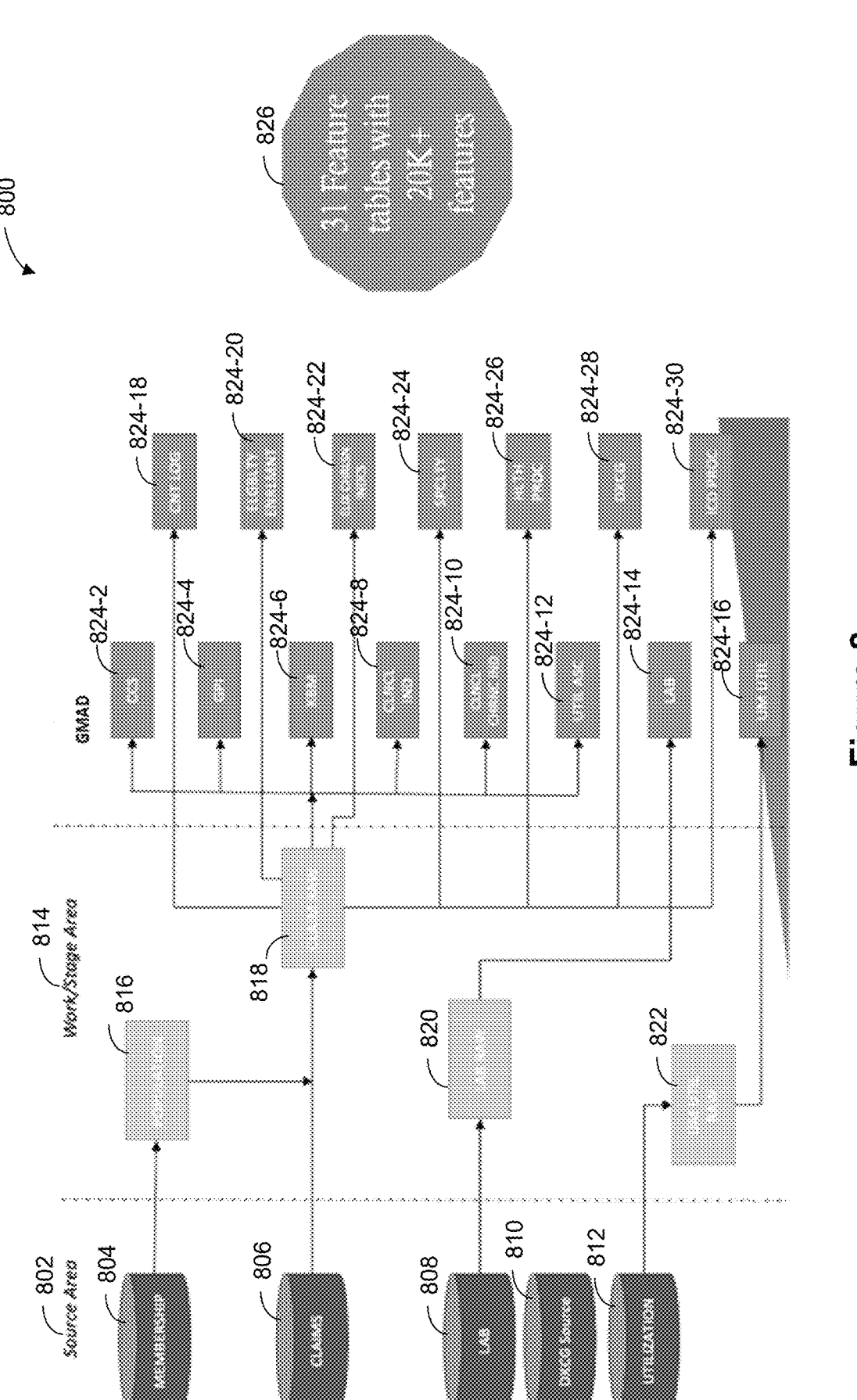
FIG. 8 is a schematic diagram of an example pipeline for feature computation, in accordance with some embodiments.

FIG. 8 is a schematic diagram of an example pipeline for feature computation 800, in accordance with some embodiments. The components of the pipeline 800 may be implemented in a cloud infrastructure, for example as a cloud service. A source area 802 may include data sources for membership 804, claims 806, lab 808, Diagnostic Cost Group (DxCG) source 810 and utilization 812. Data from the source area 802 may be retrieved into a work or stage area 814. This area may include temporary stores for raw data. For example, data from membership 804 may be brought into a population 816, data from claims 806 and the population 816 may be brought into a claim raw 818, data from lab 808 may be brought into a lab raw 820, and data from utilization 812 may be brought into a utilization raw area 822. Analytical datasets 824 may be derived from the raw data in the work or stage area 814. There may be several feature tables 826 (e.g., 31 feature tables) based on the analytic datasets 824, each feature table may include several thousand features.

Figure 9A:
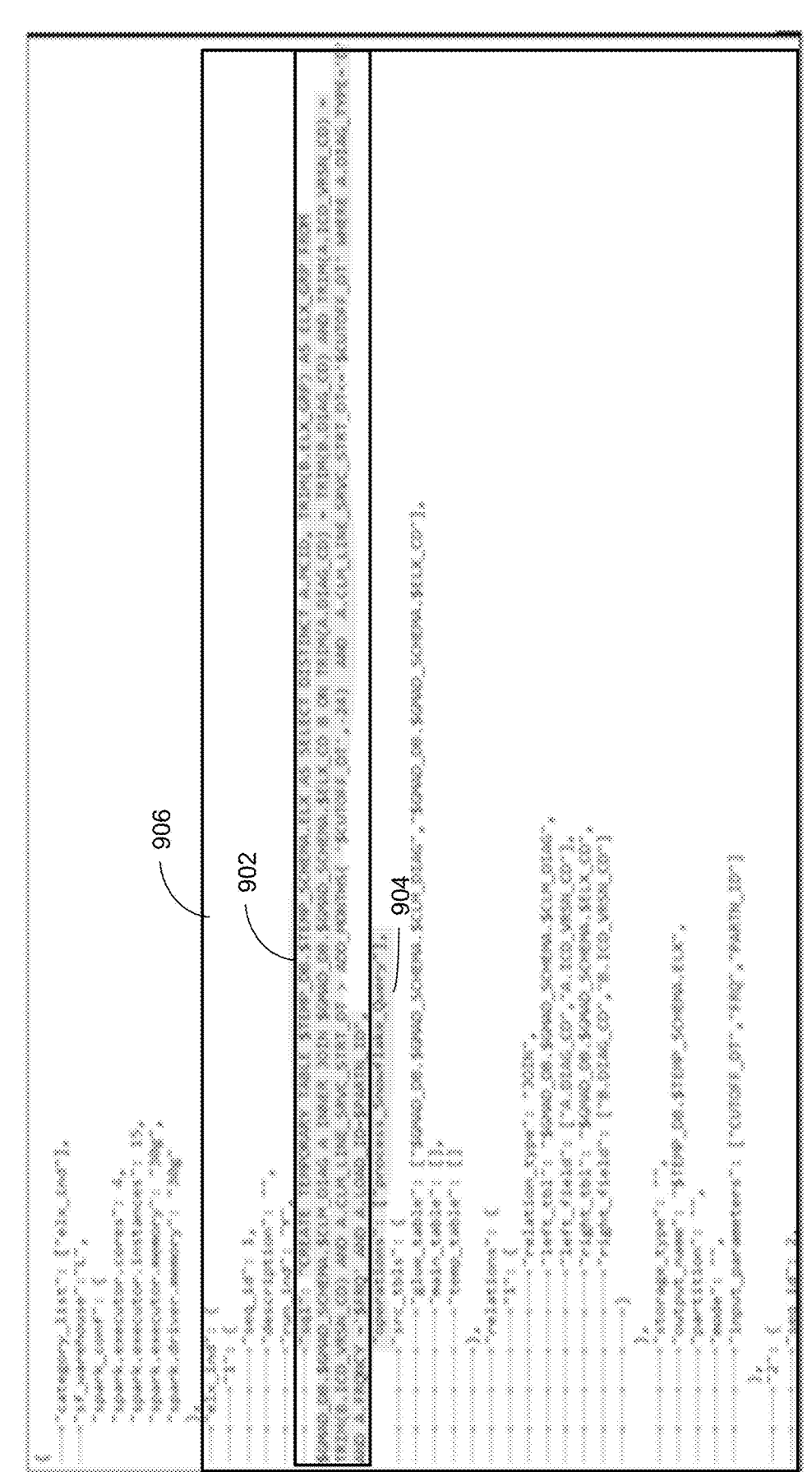
FIG. 9A shows an example job configuration, in accordance with some embodiments.
Figure 9B:
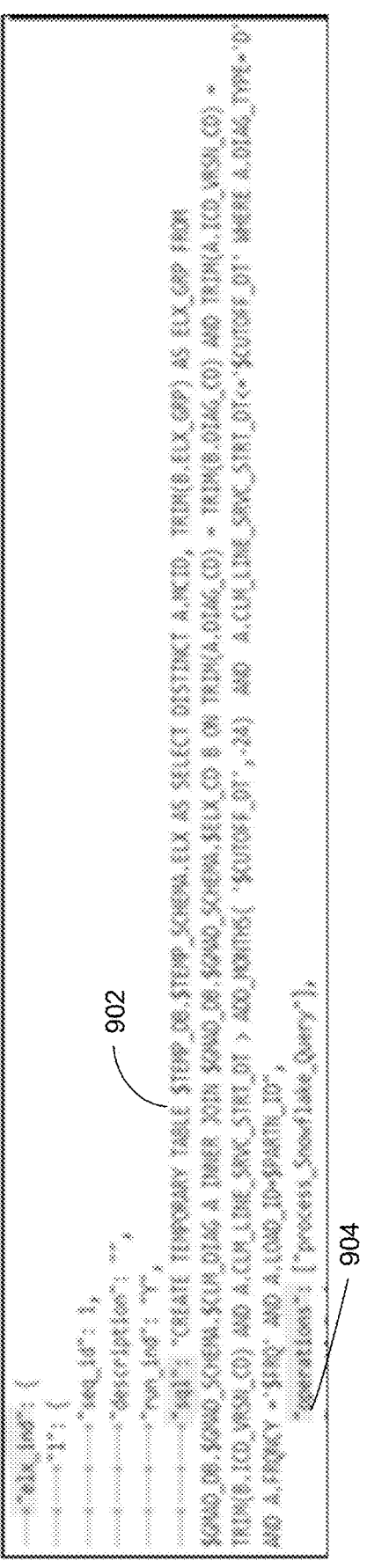
FIG. 9B shows an enlarged view of the example job configuration shown in FIG. 9A.

FIG. 9A shows an example job configuration 900, in accordance with some embodiments. The example shows independent flow between object execution and engine. The logic of the object (referred to as execution) and the environment where the object runs (referred to as engine) may be maintained as parameters in a single job configuration file. In the example configuration, sql 902 represents the logic to be executed, which may remain constant, elx_ind 906 is executed, and operations 904 represents the engine to be used for executing the logic. These parameters work hand-in-hand but are independent of each other. For example, the logic may be untouched irrespective of the engine and vice versa. The logic shown in the sql section may be executed in Snowflake (e.g., the operations section shows process_Snowflake_Query). Similar to processed_Snowflake_Query, other operations may be used. For example, operations may include: read a parquet file data from S3, run the logic over Spark engine and write the data back to S3 location (e.g., readFile, registerTempTable, run_sql, and writeFile). Or operations may include read a glue table data, run the logic over spark engine and write the data back to S3 location (e.g., run_sql, writeFile). FIG. 9B shows an enlarged view that shows the sql 902 and the operations 904.

Figure 10:
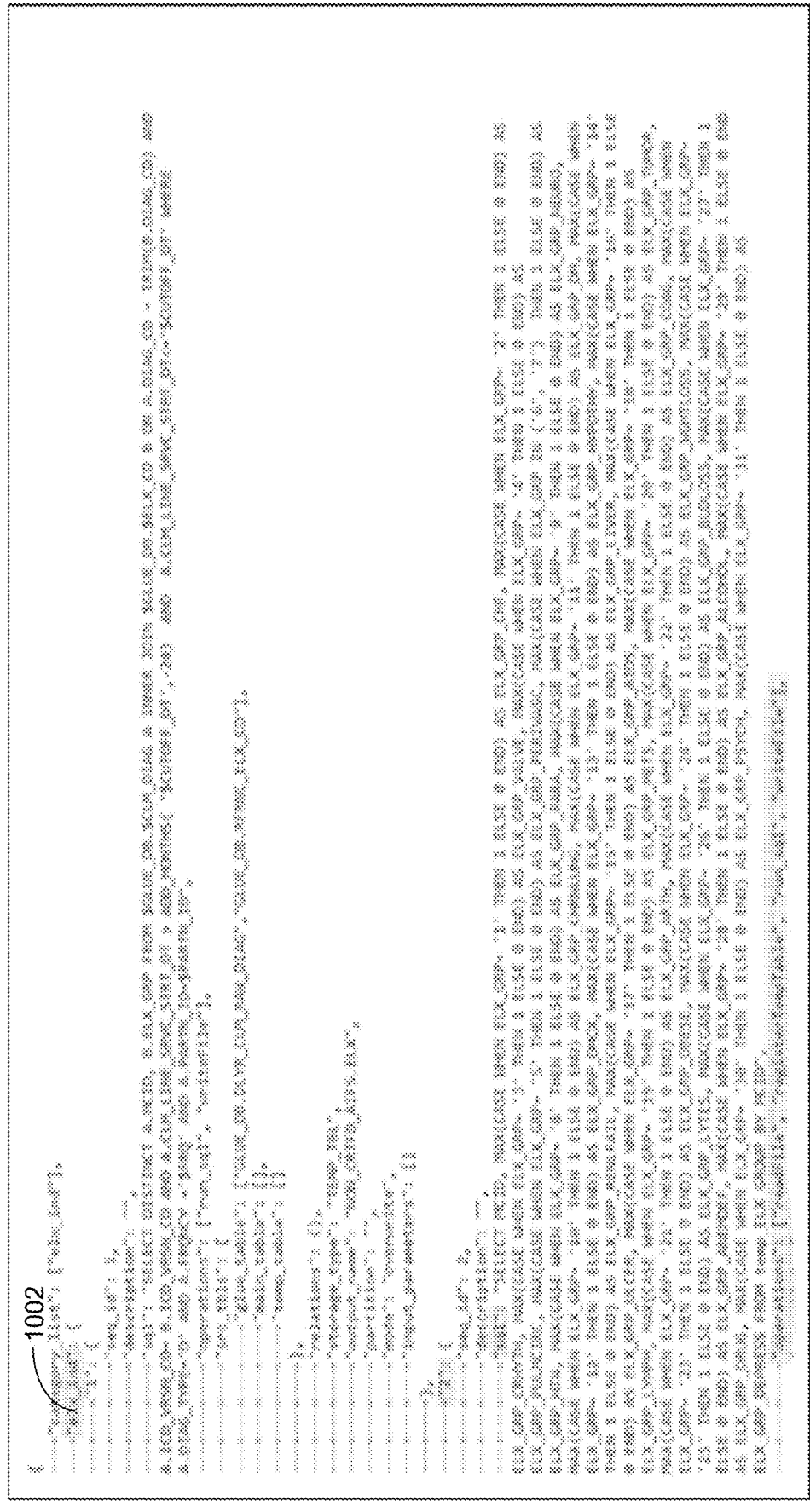
FIG. 10 shows an example job configuration, in accordance with some embodiments.

FIG. 10 shows an example job configuration 1000, in accordance with some embodiments. A configuration file may be cloud agnostic. A same configuration logic or script can be executed on different cloud platforms or on-premises. In FIG. 10, an object elx_ind 1002 can be executed from the data available in S3 over a Spark engine spun up in AWS EMR service and finally write back to S3 again. Framework operations may include readFile, registerTempTable, run_sql, and writeFile. S3 path of source or target data may be stored in a JSON file having logic parameters that may get substituted during run time. The S3 can be updated to GCP storage (if cloud service is GCP), Azure blob storage (if cloud service is Azure) or HDFS (if on-premises), with minimal configuration updates.

Some embodiments execute each query and generate metadata about the query. Metadata may be stores as a list of tables (e.g., a relations table).

```
from sql_metadata import Parser
import json
```

-continued

```
def Life_MetaData_Gen(query):
    parser = Parser(query)
    tables = parser.tables
    relations = parser.operations
    return json.dumps({'SQL Text': query, 'Tables': tables, 'Relations':
relations}, indent=4)
```

Using the example code shown above, metadata may be generated for a query. The metadata may be used for lineage generation. The lineage may be generated from a sequence of SQL queries.

Figure 11:
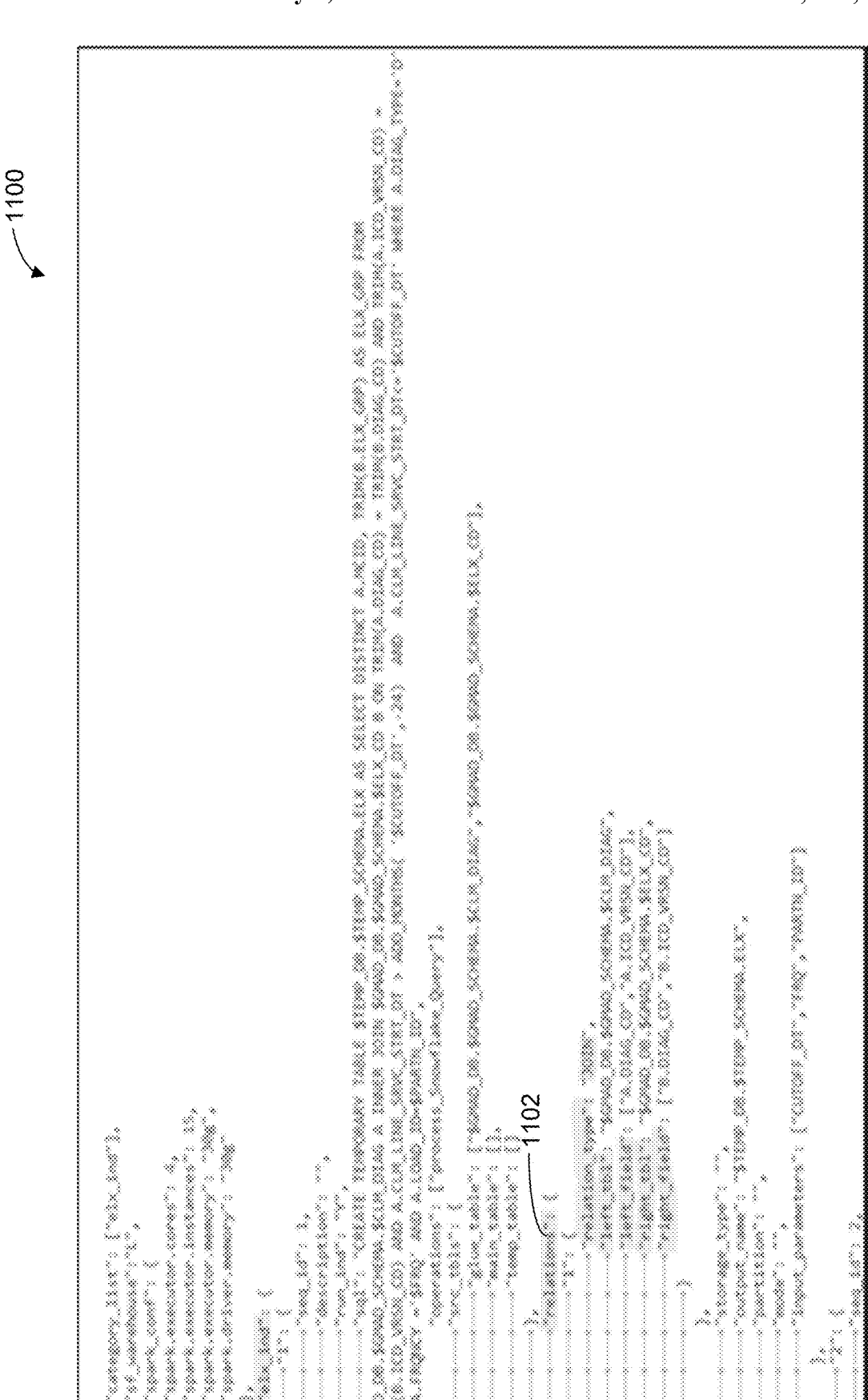
FIG. 11 shows an example configuration file with lineage information, according to some embodiments.

A lineage sequence may be maintained in a job configuration (e.g., in a JSON file) as relations (e.g., along with an SQL as execution and operations as engine) that represent the relationship between the tables with the order of the flow. FIG. 11 shows an example configuration file 1100 with lineage information, according to some embodiments. The lineage information is stored as a relations table 1102. A relation type may be used to define the relationship between tables. In the example shown, it is an inner join. left_tbl is a left table being used in the query. right_tbl is a right table being used in the query. left_field is a join columns of left table. right_field is a join column(s) of right table. The relations table may be used to create a lineage for any further integrations. The relations table may explain the logic available under sql section for quick validation.

Figure 12:
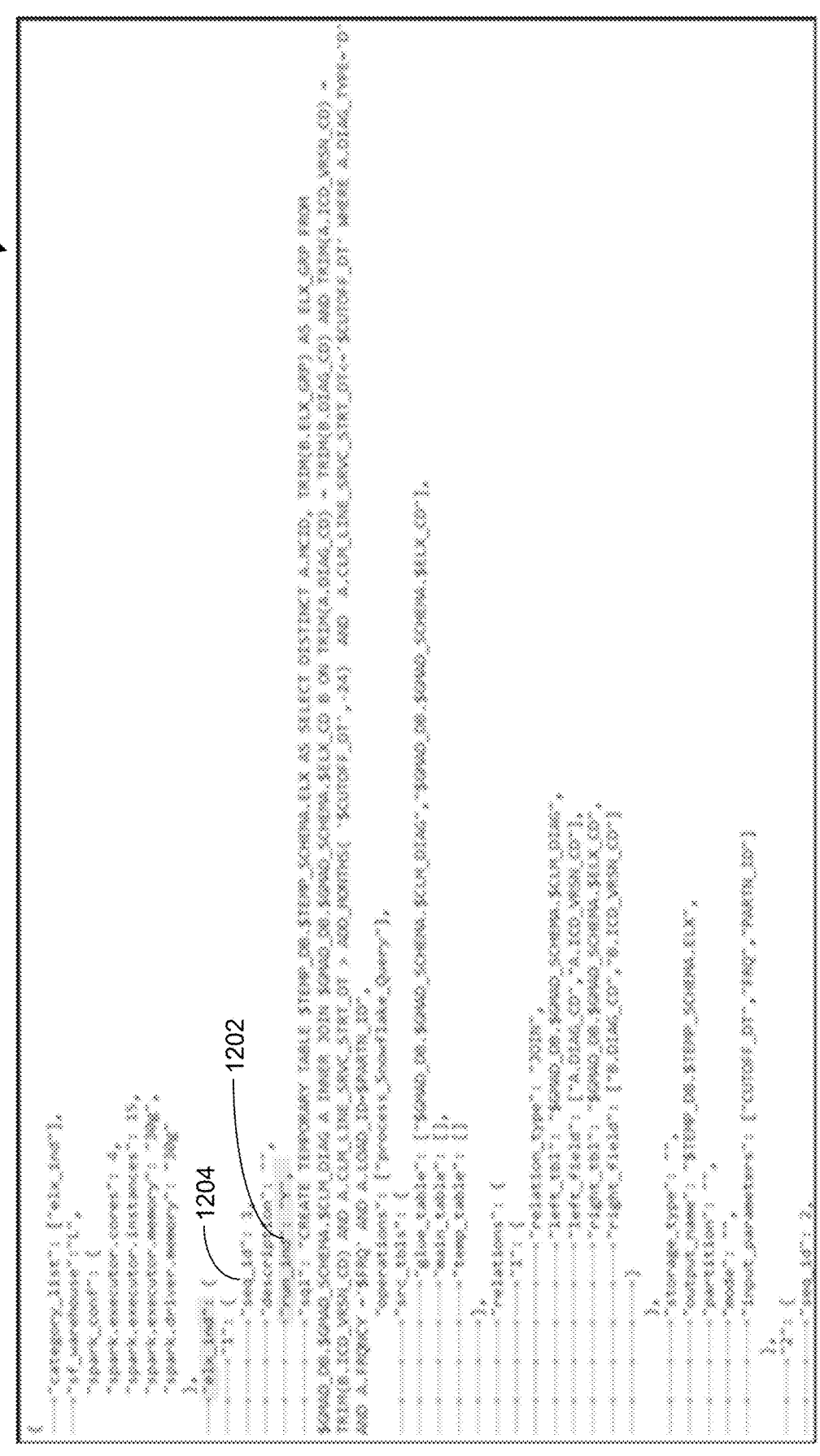
FIG. 12 shows an example configuration file for selectable execution, according to some embodiments.

FIG. 12 shows an example configuration file 1200 for selectable execution, according to some embodiments. Some embodiments execute or skip a particular sequence of an object flow using a parameter. In this example, the parameter run_ind 1202 section provides the ability to either skip or execute the sequence seq_id 1204. If the indicator is "Y", the sequence may be executed, and if the indicator is 'N', the sequence may be skipped. This may be used in situations when a product is live in production and needs execution or when execution needs to be skipped for a specific sequence flow for the debug process. In this case, debug may be performed by opening the configuration file (may be available in an S3 location) without touching an EMR engine, updating the indicator accordingly and re-running the flow.

FIG. 13 is a flowchart of an example method 1300 for engineering explainable features for machine learning, in accordance with some embodiments. The method may be performed by any of the systems (or components therein) described above in reference to FIGS. 1, 2, 4, 5 and/or 6. The method 1300 may be implemented in a cloud infrastructure, for example as a cloud service. The method 1300 may be performed at a system or a server having one or more processors, memory, and one or more programs stored in the memory and configured for execution by the one or more processors, the one or more programs including instructions for performing the steps described herein.

The method may include obtaining (1302) data from a plurality of data sources. The method may also include generating (1304), based on the data, features for training one or more machine learning models using a single data pipeline that uses a feature generation logic that is separate from an execution logic used to generate the features. The feature generation logic may be based on a type of data source corresponding to the data. The execution logic may be agnostic to the type of data source. For example, calling configuration and generation of a batch of SQL statements (sometimes referred to as execution logic) may be common for each execution; Where is SQL statements and Joins Sequence may be based on the feature generation logic. The feature generation logic may include relations and/or joins between input tables and/or intermediate tables of the plurality of data sources. Features may be generated by executing the single data pipeline based on the execution logic. For example, configuration files containing the execution the logic may be kept in a location and a single Airflow job may pull the configuration files, read any SQL statements, create a batch file, and execute the batch file using a run time. A single Airflow Directed Acyclic Graph (e.g., a collection of tasks to run, organized in a way that reflects their relationships and dependencies) may be used for 50,000 plus features, for example.

The method may also include generating (1306), based on the relations and/or joins, metadata for explaining the features for training the one or more machine learning models. For example, each Json SQL may also extract Joins, source tables and/or other metadata and stores along with the SQL. A sequence of SQLs may be kept in one JSON. Metadata that may include source tables and Joining condition in sequence may help generate lineage. The metadata may be used to draw a lineage for feature sets that may be executed.

The method may also include generating (1308), based on the metadata, lineage information representing a mapping of one or more features to intermediate tables and/or input tables. The method may also include displaying (1310) the lineage information representing the mapping of one or more features to intermediate tables and/or input tables, including allowing a user to select and/or drill down different features, intermediate tables and/or input tables. The method may also include storing (1312) the features and the metadata for the features to a feature store used for training the one or more machine learning models.

FIG. 14 is a flowchart of an example method 1400 for engineering explainable features for machine learning, in accordance with some embodiments. The method may be performed by any of the systems (or components therein) described above in reference to FIGS. 1, 2, 4, 5 and/or 6. The method 1400 may be implemented in a cloud infrastructure, for example as a cloud service. The method 1400 may be performed at a system or a server having one or more processors, memory, and one or more programs stored in the memory and configured for execution by the one or more processors, the one or more programs including instructions for performing the steps described herein.

The method may include obtaining (1402) data from a plurality of data sources. In some embodiments, the plurality of data sources corresponds to a plurality of cloud data platforms. In some embodiments, the method further includes prior to obtaining the data, interfacing with the plurality of data sources corresponding to a plurality of cloud data platforms. In some embodiments, the data includes two or more of: streams, files, and tables.

The method may also include generating (1404), based on the data, features for training one or more machine learning models using a single data pipeline that uses a feature generation logic that is separate from an execution logic used to generate the features. The feature generation logic may be based on a type of data source corresponding to the data. The execution logic may be agnostic to the type of data source. In some embodiments, the feature generation logic includes relations and/or joins between input tables and/or intermediate tables of the plurality of data sources used to derive the features. The metadata may be generated based on the relations and/or joins. In some embodiments, the features are generated by executing the single data pipeline based on the execution logic. In some embodiments, the method further includes generating the features comprises configuring and executing queries in the data pipeline based on the feature generation logic. In some embodiments, the method further includes determining whether to execute or postpone feature generation based on whether a source of the data is updated. In some embodiments, the feature generation logic is implemented using SQL queries. In some embodiments, the feature generation logic includes toggle switches for turning on or off portions specific to data sources of the plurality of data sources, for debugging purposes. In some embodiments, the feature generation logic provides an interface that allows model developers or data scientists to add features to the feature store. For example, a data scientist may need to share logic and/or SQLs with a data engineering team for further development of features, which can be a time consuming process. With the technologies described herein, the data scientist may upload a sequence of SQLs in a Json configuration file, and a new feature may be generated.

The method may also include generating (1406), based on the feature generation logic, metadata for explaining the features.

The method may also include storing (1408) the features and the metadata to a feature store used for training the one or more machine learning models.

In some embodiments, the method further includes generating (1410), based on the metadata, lineage information representing a mapping of one or more features to intermediate tables and/or input tables.

In some embodiments, the method further includes displaying (1412) the lineage information representing the mapping of one or more features to intermediate tables and/or input tables, including allowing a user to select and/or drill down different features, intermediate tables and/or input tables.

In some embodiments, the method further includes identifying updated data sources for triggering feature generation based on profiling the feature generation logic.

In some embodiments, the method further includes, while generating the features, generating only a subset of the features based on frequency of training of the one or more machine learning models.

In some embodiments, the method further includes combining the metadata with the feature generation logic and storing the combination in a text-based format for representing structured data.

While embodiments and alternatives have been disclosed and discussed, the invention herein is not limited to the particular disclosed embodiments or alternatives but encompasses the full breadth and scope of the invention including equivalents, and the invention is not limited except as set forth in and encompassed by the full breadth and scope of the claims herein.

What is claimed is:

1. A method for engineering explainable features for machine learning, the method comprising:

interfacing with a plurality of data sources corresponding to a plurality of cloud data platforms;

obtaining data from the plurality of data sources, wherein the data includes two or more of: streams, files and tables;

identifying updated data sources for triggering feature generation based on profiling a feature generation logic;

determining whether to execute or postpone feature generation based on whether a source of the data is updated; and in accordance with a determination that the source of the data is updated:

generating, based on the data, a subset of features based on frequency of training of one or more machine learning models using a single data pipeline that uses the feature generation logic that is separate from an execution logic used to generate the features, wherein the feature generation logic is based on a type of data source corresponding to the data, wherein the execution logic is agnostic to the type of data source, wherein the feature generation logic includes relations and/or joins between input tables and/or intermediate tables of the plurality of data sources, wherein features are generated by configuring and executing the single data pipeline based on the execution logic, wherein the feature generation logic is implemented using SQL queries, wherein the feature generation logic includes toggle switches for turning on or off portions specific to data sources of the plurality of data sources, for debugging purposes;

generating, based on the relations and/or joins, metadata for explaining the features for training the one or more machine learning models;

generating, based on the metadata, lineage information representing a mapping of one or more features to intermediate tables and/or input tables; and combining the metadata with the feature generation logic and storing, to a feature store, the combination in a text-based format for representing structured data, wherein the feature store is used for training the one or more machine learning models, wherein the feature generation logic provides an interface that allows model developers or data scientists to add features to the feature store.

2. The method of claim 1, further comprising:

displaying the lineage information representing the mapping of one or more features to intermediate tables and/or input tables, including allowing a user to select and/or drill down different features, intermediate tables and/or input tables.

3. The method of claim 1, wherein generating the features comprises configuring and executing queries in the single data pipeline based on the feature generation logic.

4. The method of claim 1, further comprising:

while generating the features, generating only a subset of the features based on frequency of training of the one or more machine learning models.

* * * * *